Oct. 27, 1959 S. LOEWE ET AL 2,909,912
MAGNETIC TAPE RECORDER WITH FRICTION DRIVE
Filed Aug. 13, 1956
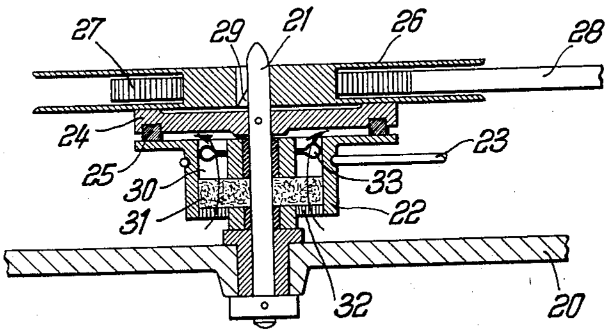
Inventors:
Siegmund Loewe
Werner Zorn United States Patent Office 2,909,912

Patented Oct. 27, 1959

2,909,912

MAGNETIC TAPE RECORDER WITH FRICTION DRIVE

Siegmund Loewe, Yonkers, N. Y., and Werner Zorn, Berlin-Zehlendorf-West, Germany Application August 13, 1956, Serial No. 603,782

Claims priority, application Germany August 19, 1955

3 Claims. (Cl. 64—30)

The invention refers to magnetic tape recorders with friction disc drive; the aim is the formation of an advantageous type of friction disc drive as portection against dust, in particular the dust caused by abrasion of the tape.

The drive of magnetic tapes in magnetic tape recorders is generally carried out in that the recording tape on the pick-up, i.e. the magnetic recording head, is moved with uniform speed and with constantly increasing or decreasing speed from the fully wound-up tape reel to the winding up reel which at first is empty. In order to compensate for acceleration or retardation of the movement of the tape, the tape winding reels are driven via friction gears.

Such friction gearing usually consists of a belt pulley driven by the motor and a friction disc provided with a felt lining and carrying the tape winding reel. Experience shows that with the movement of the tape and abrasion of the tape results, i.e. owing to the friction a tape dust arises which is easily deposited on the friction drive and, after a relative period of operation, the friction can be so considerably increased that the friction drive no longer prefectly operates.

The invention aims to form the friction drive in such a way that such disturbances of the friction drive, caused by the dust arising from the abrasion of the tape or also caused by other dust settling there, are avoided.

The invention is characterized in that quite usual means are provided which prevent an undesired influencing of the frictional effect of the friction drive of a magnetic tape recorder due to dust particles penetrating from outside owing to abrasion of the tape or other impurities. In accordance with the invention, these means consist of a special formation of the parts belonging to the friction drive by the use of a ventilator or similar means which produces overpressure in the casing of the friction drive.

Further details of the invention are given on the basis of the examples shown in the accompanying figure which shows a friction drive for magnetic tape recorders wherein an overpressure is produced, by means of a ventilator, within the parts of the drive decisive for the friction.

The axle 21 is fitted in the chassis plate 20 of the magnetic tape recorder and can be moved in a vertical direction. The belt pulley 22 is driven by a motor via belt 23. The friction disc 24 is fastened on the axle 21 and can, by the downward movement of the axle 21 with the friction lining 25 be pressed against the plate-shaped upper part of the belt pulley 22 whereby then the friction disc 24 and thus also the tape reel 26 with the tape roll 27 are driven by the driving movement by means of the wedge 29.

The belt pulley 22 now in accordance with the present invention is formed in such a way that in its upper part surfaces, similar to fan blades are provided within the ring-shaped opening 30. Below this ring-shaped aperture is an air filter 31 and further sieve 32. With the rotatory movement of the belt pulley 22, the air is sucked in from below, with corresponding arrangement of the blade surfaces 33 in the aperture 30, and pressed in the space between the belt pulley 22 and the friction disc 24. By means of this air current or overpressure, any dust particles will be kept away from this space so that the undesired influencing of the frictional effect between belt pulley and friction disc, which is of decisive importance for the rotatory movement of the tape reel, is avoided. The air filter 31 can be operated mechanically or also electro-statically.

The increase of the friction of the friction drive for the purpose of driving the tape reel can also be carried out just as well by an upward movement of the tape reel axle. Important for the tape reel drive is only that the friction between belt pulley and friction disc of the friction drive be increased.

What we claim is:

1. In a magnetic tape recorder comprising a power operated drive, a drive pulley, a tape reel, and a friction coupling arranged between said drive pulley and said tape reel, the use of means for preventing dust particles from permeating from outside into the friction surfaces of said friction coupling, said dust particles preventing means consisting of an air-blast generating system within the friction coupling parts adapted to keep any dust particles away from the friction surfaces of the friction coupling.

2. In a magnetic tape recorder comprising a power operated drive, a drive pulley, a tape reel, and a friction coupling arranged between said drive pulley and said tape reel, the use of means for preventing dust particles from permeating from outside into the friction surfaces of said friction coupling, said dust particles preventing means consisting of fan blades arranged in the drive pulley of said friction coupling and adapted to direct an air current on the friction surfaces of said friction coupling.

3. In a magnetic tape recorder a power operated drive, a drive pulley, a tape reel, and a friction coupling with a friction disc arranged between said drive pulley and said tape reel, said drive pulley cooperating with said friction disc by its upper surface and forming a separate space between said friction disc and said drive pulley, said drive pulley further containing in its upper part a ring shaped opening provided in its interior with surfaces similar to fan blades which are adapted to produce, if rotated, an air stream arising within said drive pulley from below to said upper space between said friction disc and said drive pulley.

References Cited in the file of this patent

UNITED STATES PATENTS

| | | |
|---|---|---|
| 2,278,680 | Thompson | Apr. 7, 1942 |
| 2,436,418 | Bradford | Feb. 24, 1948 |